United States Patent
Rupp

(10) Patent No.: US 11,774,157 B2
(45) Date of Patent: Oct. 3, 2023

(54) BLENDER-COMPATIBLE ICE-CONDITIONING APPARATUS

(71) Applicant: Snowie LLC, Salt Lake City, UT (US)

(72) Inventor: Carl A. Rupp, Salt Lake City, UT (US)

(*) Notice: Subject to any disclaimer, the term of this patent is extended or adjusted under 35 U.S.C. 154(b) by 318 days.

(21) Appl. No.: 16/866,429

(22) Filed: May 4, 2020

(65) Prior Publication Data

US 2020/0348067 A1 Nov. 5, 2020

Related U.S. Application Data

(60) Provisional application No. 62/843,247, filed on May 3, 2019.

(51) Int. Cl.
F25C 5/12 (2006.01)
F25C 5/20 (2018.01)
A23G 9/04 (2006.01)

(52) U.S. Cl.
CPC .................. *F25C 5/12* (2013.01); *F25C 5/20* (2018.01); *A23G 9/045* (2013.01)

(58) Field of Classification Search
CPC ... F25C 5/12; F25C 5/20; A23G 9/045; A23G 9/12; A23G 9/22
See application file for complete search history.

(56) References Cited

U.S. PATENT DOCUMENTS

| | | | |
|---|---|---|---|
| 4,930,685 A | 6/1990 | Landers | |
| 6,062,426 A * | 5/2000 | Bartholmey | A23G 9/045 222/234 |
| 2006/0168984 A1* | 8/2006 | Myers | F25C 5/046 62/344 |
| 2006/0202070 A1 | 9/2006 | Bohannon, Jr. et al. | |
| 2015/0342218 A1 | 12/2015 | Rupp | |
| 2020/0003472 A1 | 1/2020 | Rupp | |

FOREIGN PATENT DOCUMENTS

GB 2387558 A 10/2003

OTHER PUBLICATIONS

United States Patent and Trademark Office, "International Search Report", dated Aug. 13, 2020, International Application No. PCT/US20/31366.

* cited by examiner

*Primary Examiner* — Lionel Nouketcha
(74) *Attorney, Agent, or Firm* — Terrence J. Edwards; TechLaw Ventures, PLLC

(57) ABSTRACT

Apparatuses, methods, and systems, for producing frozen confections and conditioning ice for use in frozen confections. An apparatus includes a housing comprising an inner cavity defined by a sidewall and an ice conditioning blade disposed within the sidewall of the housing. The apparatus includes a paddle wheel disposed within the inner cavity of the housing. The apparatus includes a drive coupler for communicating with a motor, wherein the drive coupler communicates power from the motor to the paddle wheel.

32 Claims, 11 Drawing Sheets

BLENDER-COMPATIBLE ICE-CONDITIONING APPARATUS

CROSS-REFERENCE TO RELATED APPLICATIONS

This application claims the benefit of U.S. Provisional Patent Application No. 62/843,247, filed May 3, 2019, titled "BLENDER-COMPATIBLE ICE-CONDITIONING APPARATUS," which is incorporated herein by reference in its entirety, including but not limited to those portions that specifically appear hereinafter, the incorporation by reference being made with the following exception: In the event that any portion of the above-referenced provisional application is inconsistent with this application, this application supersedes the above-referenced provisional application.

TECHNICAL FIELD

The disclosure relates generally to systems, methods, and devices for preparing a frozen confection and particularly relates to blender-compatible devices for producing frozen confections.

BACKGROUND

Frozen confections are an increasingly popular dessert. Ice can be processed into eatable forms such as snow cones or shaved ice. Snow cones are formed of small granules of ice and shaved ice is formed of light, fluffy, finely textured ice. Such ice-based desserts can be flavored with syrups in a variety of flavors and colors. Because ice-based desserts are increasingly popular, there is a desire for devices that can produce shaved ice or snow cones at home. However, machines for creating and processing frozen confections are typically large and of commercial grade. These large commercial-grade machines are manufactured to accommodate commercial settings to produce snow cones or shaved ice for many customers.

Some smaller machines for producing frozen confections in a home environment or small party setting are known. However, such machines are typically configured for producing shaved ice or snow cones and are not configured for other uses. In some instances, it may be desirable to have a single device that is capable of producing multiple different products or to have a single device that is configurable for multiple different uses by using different settings or attachments. What is needed is a frozen confection machine that is portable, provides convenient operation and good performance, and is sized for easy storage. Additionally, what is needed is a machine that is configurable for multiple different uses and/or devices that are compatible with machines that are capable of producing different products.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
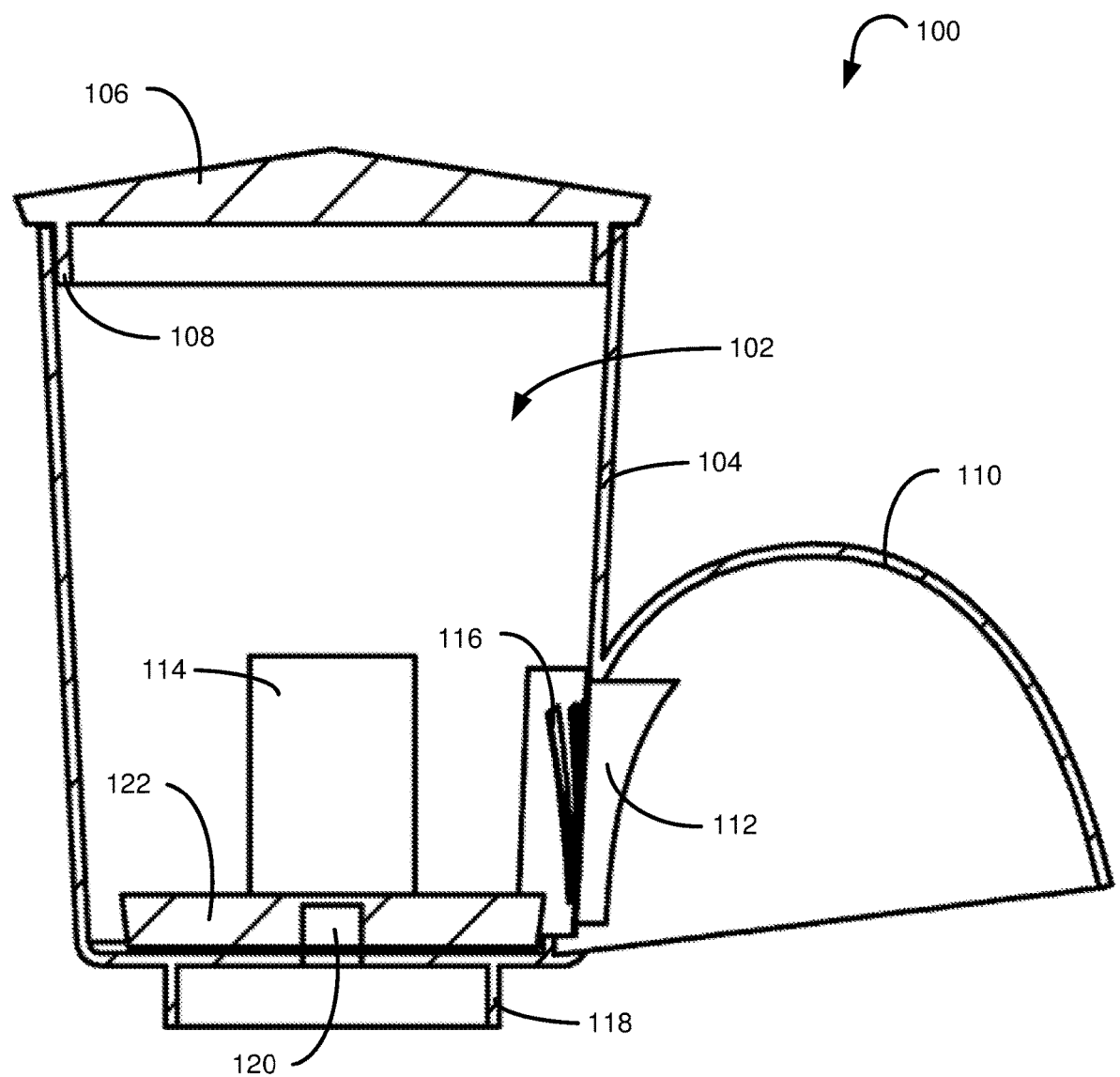
FIG. 1 illustrates a cross-sectional side view of an embodiment of a portable apparatus for producing a frozen confection with the motor of an independent device.

The disclosure extends to systems, methods, and devices for producing frozen confections and conditioning ice for use in frozen confections. Particularly, the disclosure extends to systems, methods, and devices for producing frozen confections using the motor of an independent device such as a blender or mixer. An embodiment of the disclosure is an apparatus that is compatible with a blender and configured for producing frozen confections such as snow cones or shaved ice.

Some small and portable devices for producing frozen confections are known and can be suitable for home use or for producing frozen confections for a small party. However, such devices are typically configured only for processing ice for snow cones, shaved ice, or other ice-based confections. Some users may have limited storage space and may have difficulty finding a place to store a device that does not have multiple uses or does not produce many different types of products. Further, some users may struggle to afford a standalone device that is not configurable for producing many different types of products. Further, common household devices such as blenders or mixers are configured for aiding in particular tasks and are not suitable for producing frozen confections. Specialized devices and systems are needed for processing ice into a fluffy and light texture that is suitable as a frozen dessert.

In light of the foregoing, disclosed herein are systems, methods, and devices for producing frozen confections using the motor of another device. The devices disclosed herein may be compatible with a blender, mixer, or other motor that is commonly present in a household kitchen. Further, the devices disclosed herein may be used in conjunction with a different device to produce many different products. For example, an apparatus of the disclosure is compatible with a household blender such that the blender can produce smoothies, soups, milkshakes, and other products, and may further produce snow cones or shaved ice when used with the apparatuses disclosed herein.

In an embodiment, an apparatus is provided for producing a frozen confection such as a snow cone or shaved ice. The apparatus may be used in conjunction with a separate device having a motor such as a blender or mixer. The apparatus includes a housing configured for receiving ice therein. In an embodiment, the housing is shaped similar to a jar or container used in conjunction with a blender. The apparatus includes a drive coupler configured for receiving a drive shaft of the separate device, wherein the drive shaft of the separate device is connected to a motor of the separate device. The apparatus includes a blade for conditioning ice. In an embodiment, the blade is disposed within a wall of the housing.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems and methods for producing frozen confections are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Referring now to the figures, FIG. 1 illustrates a cross-sectional side view of an apparatus 100 for producing frozen confections. The apparatus 100 is compatible with independent devices, such as a blender, such that the apparatus 100 can be operated by a motor of the independent device. In some embodiments, the independent device may be used with the apparatus 100 or with other devices, such as a jar of a blender, a bowl of a mixer, and so forth. The apparatus 100 may be manufactured and/or sold in connection with the independent device as a single system. Alternatively, the apparatus 100 may be manufactured and/or sold independently of the independent device. The independent device may be produced by a third party, or by the manufacturer of the apparatus 100, and the apparatus 100 may be constructed to be compatible with the independent device.

The apparatus 100 includes a housing 102 comprising an inner cavity for receiving ice to be conditioned. The apparatus includes a lid 106 for covering the housing 102. The housing 102 includes an inner cavity defined by the sidewall 104, wherein the inner cavity is configured for receiving ice that may be conditioned by the apparatus 100 into a snow cone or other frozen confection. The apparatus 100 includes a spout 112 and ice shaper 110 for delivering and shaping the conditioned ice into a cup or other container for receiving the shaved ice product. The apparatus 100 includes a motor attachment 118 for securing the apparatus 100 to an independent device that has a motor, such as a blender. The apparatus 100 includes a drive coupler 120 for communicating with a motor of an independent device. The drive coupler 120 may be a female fitting for receiving a corresponding male connector on the independent device. Alternatively, the drive coupler 120 may be a male fitting for receiving a corresponding female connector on the independent device. The apparatus includes one or more ice conditioning blades 116 for conditioning the ice and one or more paddles 114 for moving the ice in the housing 102 and feeding the ice through the one or more ice conditioning blades 116.

The housing 102 is defined by one or more sidewalls 104 providing an enclosure around ice within the housing 102. The one or more sidewalls 104 may include a single "continuous" sidewall in an elliptical, circular, or other round formation. The one or more sidewalls 104 may include a plurality of sidewalls forming a square, rectangular, or other formation. It should be appreciated that the configuration of the sidewalls 104 may also define the confines and bounds of the inner cavity. The housing 102 includes an inner cavity capable of receiving ice therein.

The sidewall 104 may form a round and smooth space within the housing 102. The sidewall 104 may form a square or rectangular space within the housing 102. The sidewall 104 may be constructed of a glass, smooth plastic, or other smooth material such that ice within the housing 102 does not attach to the sidewall 104. The sidewall 104 may have at least one cutout, groove, or slot for receiving an ice conditioning blade 116 as shown in the figure. The sidewall 104 of the housing 102 may include grooves for receiving and holding the ice conditioning blade 116 at an opening in a lower portion of the sidewall 104. For example, the ice conditioning blade 116 may slide downward into the grooves to be positioned in the sidewall 104 such that only conditioned ice is allowed to exit the housing 102 through the spout 112 after being processed by the ice conditioning blade 116.

The lid 106 covers the housing 102 such that ice remains in the housing 102 during operation and is not ejected from the top opening of the housing 102. The lid 106 may include a transparent portion for monitoring ice in the housing 102. The lid 106 may have a seal 108 configured to securing the lid 106 to the housing. The seal 108 may include a catch or other mechanical device for locking the lid 106 to the housing 102. The seal 108 may secure the 106 to the housing 102 by way of tension, for example the lid 106 may be constructed of a substance such as rubber or silicone, and the seal 108 may form a tight enclosure with the housing 102. The lid 106 may include a removable secondary lid that may be lifted during operation to add more ice to the housing 102.

The ice may be moved within the housing 102 by the one or more paddles 114. The paddle 114 may be connected with the drive coupler 120 such that the motor of the independent device, such as the blender or mixer, causes the paddle 114 to spin around within the housing 102 thereby creating a centrifugal force. The paddle 114 causes the ice within the housing 102 to continue to move and further causes the ice within the housing 102 to be fed or pushed through the ice conditioning blade 116. The paddle 114 may be connected to a paddle wheel 122 and the paddle wheel 122 may be connected to the drive coupler 120 such that the paddle wheel is spun by the drive shaft of a separate device such as a blender or mixer. The axis of rotation of the paddle wheel 122 may be generally aligned with the center axis of the housing 102.

The ice conditioning blade 116 conditions the ice. Regular ice, such as chunked, cubed, or other shaped or formed ice, whether produced by a typical consumer freezer or otherwise, may be dropped into the housing. The apparatus may be connected 100 to another device such as a blender or mixer that has a motor and a drive shaft. The drive coupler 120 of the apparatus receives the drive shaft of the other device. The motor of the independent device is in communication with grips within the drive coupler 120 and this causes the paddle 114 to spin or move within the interior space of the housing 102. The movement of the paddle 114 causes the ice to move in a circular motion around the interior space of the housing 102. When the ice is pushed against the side of the housing 102 that includes the ice conditioning blade 116, the ice may be pushed through the ice conditioning blade 116 and the blade may shave off portions of the ice or otherwise condition the ice into a snow cone or shaved ice product. The conditioned ice product exits the apparatus 100 by way of the spout 112 after the ice has been fed through the ice conditioning blade 116 and transformed into a conditioned ice product. The ice conditioning blade 116 may have a curvature matching that of the housing 102 and the ice conditioning blade 116 may be integrated or locked into a wall of the housing 102. In an embodiment, the ice conditioning blade 116 is removably attached to the housing 102 to enable easy cleaning or sharpening of the ice conditioning blade 116.

The drive coupler 120 is configured to communicate with the motor of an independent device. Various embodiments of the drive coupler 120 may exist for communicating with different models or embodiments of the independent device. For example, where the independent device is a blender, the apparatus 100 may be powered by a motor disposed within the blender base. The blender base may include a male drive shaft protruding outward from the blender base and configured for receiving a corresponding female part on a blender jar. Alternatively, the blender base may include a female drive socket for receiving a corresponding male part on a blender jar. The apparatus 100 may be used in connection with the blender base, rather than the default blender jar. Therefore, the drive coupler 120 of the apparatus 100 may include either one of a drive shaft or a drive socket as deemed appropriate based on the embodiment of the blender base.

Figure 2:
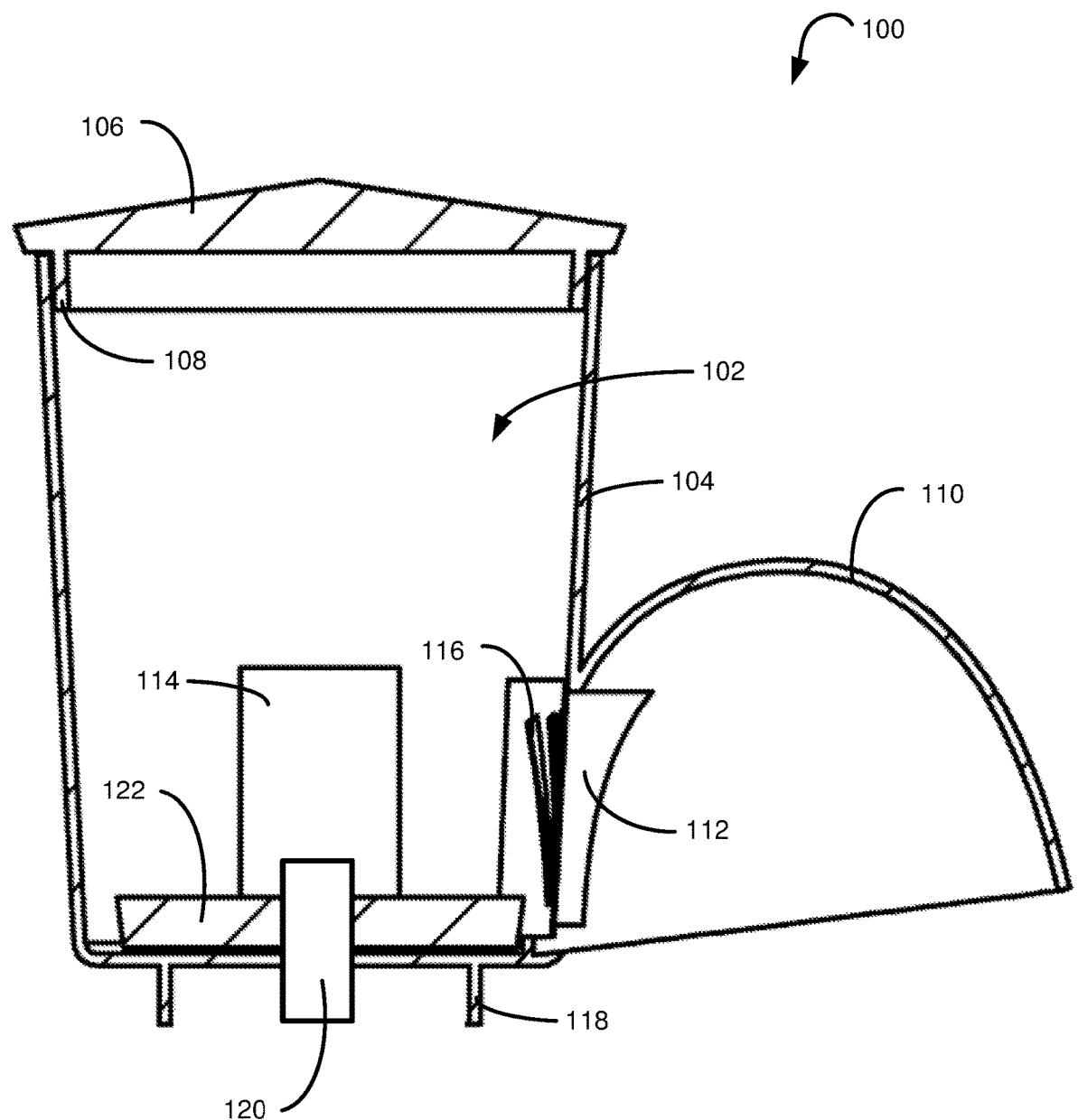
FIG. 2 illustrates a cross-sectional side view of an embodiment of a portable apparatus for producing a frozen confection with the motor of an independent device.

The drive coupler 120 may include ribbing or grips configured for contacting matching ribbing or grips on a drive shaft or drive socket of an independent device such as a blender or mixer. In the embodiment illustrated in FIG. 1, the drive coupler 120 is a drive socket, and the drive socket is sized and configured for receiving a corresponding drive shaft of a blender. In an alternative embodiment as illustrated in FIG. 2, the drive coupler 120 is a drive shaft that is sized and configured for insertion into a corresponding drive socket of a blender. In these embodiments, the corresponding component (i.e., the drive shaft or the drive socket) of the blender is connected to a blender motor that causes the drive shaft to spin at high speeds and with sufficient torque for mixing, chopping, and/or blending ingredients or materials. The drive coupler 120 receives the drive shaft or drive socket of the blender and further causes the paddle 114 to spin using the force provided by the blender motor. The drive coupler 120 may be manufactured to receive a specific brand or type of product, such as a specific brand or model of a blender. The drive coupler 120 may include removable or replaceable tips or devices that cause the drive coupler 120 to be capable of attaching to multiple different brands or models of blenders, mixers, or other independent devices having a motor.

In an embodiment, the drive coupler 120 is configured to connect with and receive a drive shaft that is directly connected to a motor of an independent device such as a blender or mixer. By way of the drive shaft of the independent device, the drive coupler 120 of the apparatus 100, and the paddle 114, the motor of the separate device causes ice to spin around within the housing 102 and further drives the ice through the ice conditioning blade 116. In an alternative embodiment, the drive coupler 120 is configured to connect with and be inserted into a drive socket that is directly connected to a motor of an independent device such as a blender or mixer. By way of the drive socket of the independent device, the drive coupler 120 of the apparatus causes the paddle wheel 122 and the paddle 114 to rotate and/or revolve around a center axis of the housing 102 to feed ice through the ice conditioning blade 116.

The drive coupler 120 may include a plurality of channels configured for connecting with corresponding protruding ribs on a corresponding fitting of the independent device. The corresponding fitting may be in direct or indirect communication with the motor of the independent device. Alternatively, or in addition to the channels, the drive coupler 120 may include a plurality of protruding ribs for connecting with corresponding channels on a corresponding fitting of the independent device. The drive coupler 120 may include any suitable drive shaft or drive socket configuration as deemed appropriate. The configuration of the drive coupler 120 may be dependent on the configuration of the independent device. In an embodiment, the drive coupler 120 is interchangeable such that the apparatus 100 may be used in connection with multiple different independent devices. The drive coupler 120 may be configured as a "universal" drive coupler such that the apparatus 100 may be used in connection with multiple possible independent devices. For example, the apparatus 100 may be configured to be compatible with multiple blender bases available to a consumer.

The conditioned ice product is fed from the housing 102 through the ice conditioning blade 116 and exits the apparatus 100 by way of the spout 112. The conditioned ice may be ejected from the spout 112 where it may be collected in a cup, bowl, dish, or other receptacle. The conditioned ice may build up within the interior space of the ice shaper 110. In the example embodiment illustrated in FIG. 1, the ice shaper 110 has a dome shape such that the conditioned ice forms a dome shape. It should be appreciated the ice shaper 110 may have any suitable shape for altering the shape of the conditioned ice.

FIG. 2 is a cross-sectional view of an embodiment of a portable apparatus 100 for product a frozen confection. The apparatus 100 illustrated in FIG. 2 is similar to that illustrated in FIG. 1. The drive coupler 120 illustrated in FIG. 2 is a drive shaft configured for communicating with a corresponding drive socket on an independent device such as a blender or mixer. This is an alternative embodiment relative to FIG. 1, wherein the drive coupler 120 is a drive socket configured for communicating with a corresponding drive shaft of an independent device.

Figure 3:
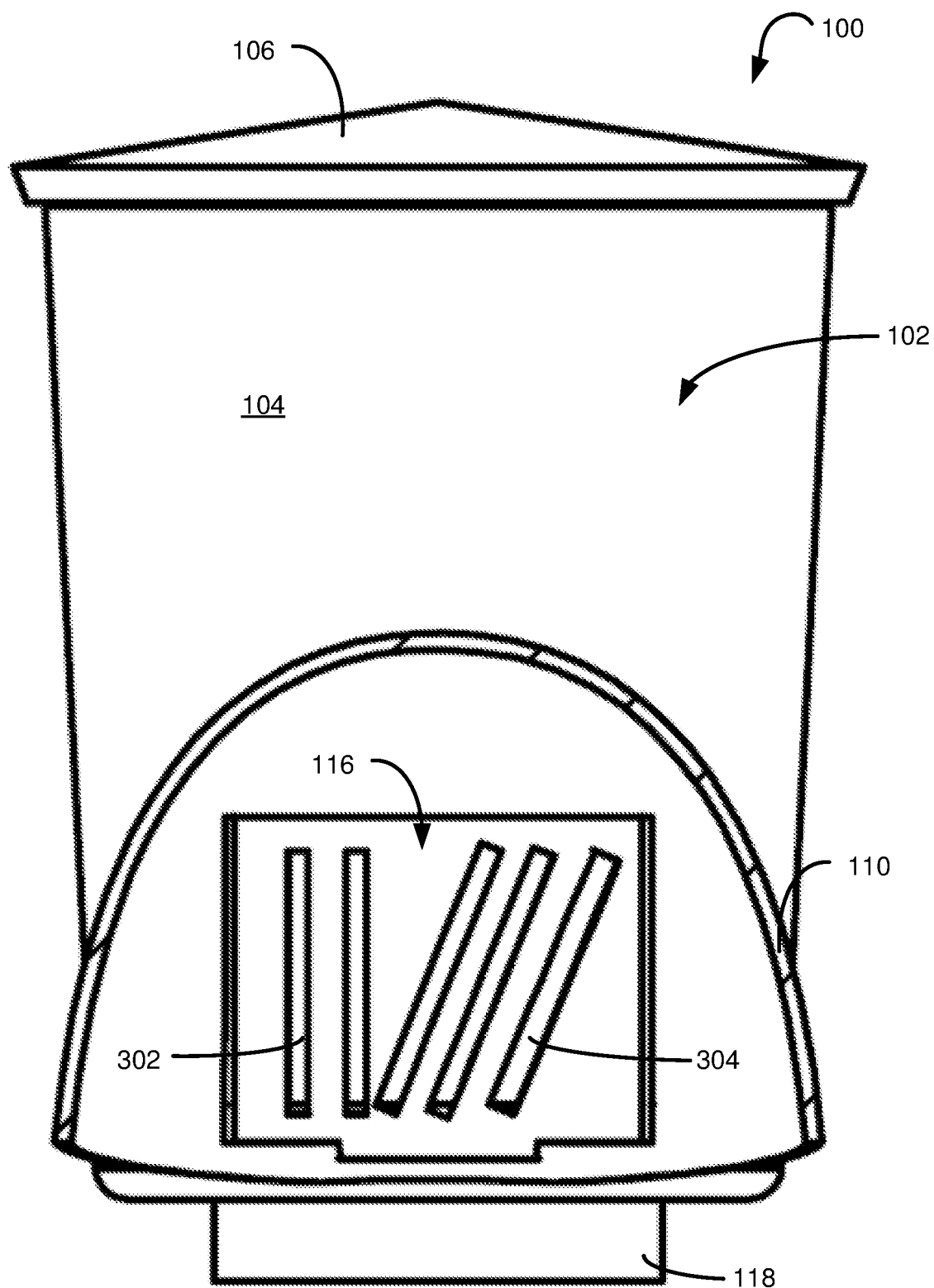
FIG. 3 illustrates a cross-sectional front view of an embodiment of a portable apparatus for producing a frozen confection with the motor of an independent device.

FIG. 3 illustrates a front view of the apparatus 100 with the ice shaper 110 cut away such that the ice conditioning blade 116 can be seen. As shown in FIG. 3, the ice conditioning blade 116 can have vertical teeth 302, slanted teeth 304, and may further have horizontal teeth (not shown) with respect to the body of the housing 102. In an embodiment, the ice conditioning blade 116 only has vertical teeth 302 with respect to the body of the housing 102. In an embodiment, the ice conditioning blade 116 only has parallel slanted teeth 304 with respect to the body of the housing 102. In an embodiment, the ice conditioning blade 116 only has slanted teeth 304 that are slanted at multiple different angles with respect to a midline of the body of the housing 102. In an embodiment, the ice conditioning blade 116 only has horizontal teeth with respect to the body of the housing 102. In an embodiment, the ice conditioning blade 116 has a mixture of vertical teeth 302, slanted teeth 304 at one or more angles, and/or horizontal teeth (not shown). The direction, length, and width of the teeth may be altered in different embodiments.

In the illustration shown in FIG. 3, a portion of the ice shaper 110 has been cut away so that the ice conditioning blade 116 can be seen. In an example, the lid 106 is removed from the housing 102 and ice is disposed within the housing 102. The apparatus 100 is configured to be use with a separate motored device such as a blender. The apparatus 100 uses the motor of the separate device to cause the paddles 114 to spin and push the ice through the ice conditioning blade 116 to be conditioned. The ice is pushed through the teeth (302, 304) of the ice conditioning blade 116 and the teeth condition the ice to be a light and fluffy texture suitable for a frozen confection such as a snow cone or shaved ice. The conditioned ice exits the apparatus 100 and may be deposited into a cup or other container. The ice shaper 110 may be used to form the conditioned ice. It should be appreciated the ice shaper 110 may be any suitable or desirable shape such as the dome shaped illustrated in the figures or some other shape.

Figure 4:
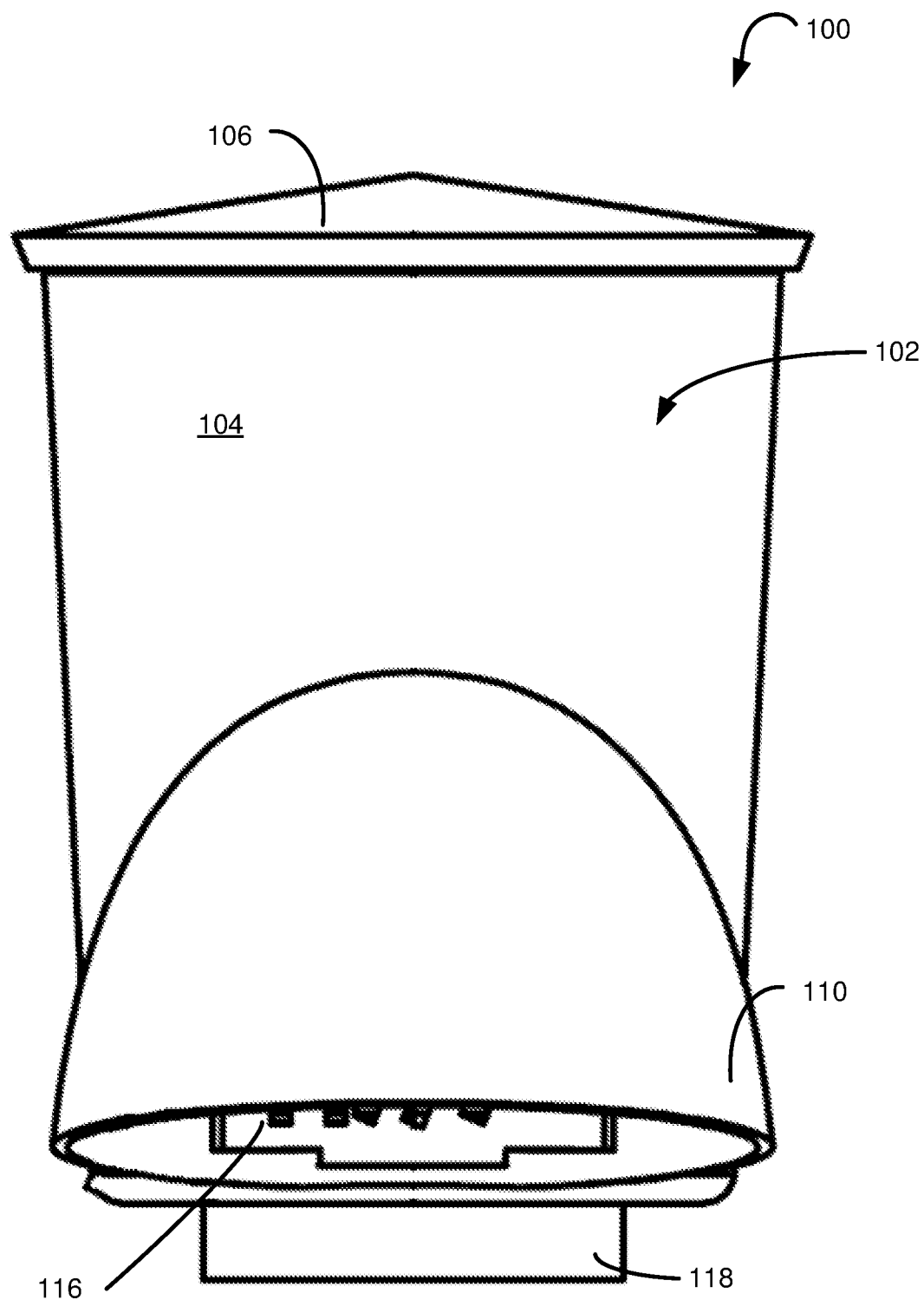
FIG. 4 illustrates a front view of an embodiment of a portable apparatus for producing a frozen confection with the motor of an independent device.

FIG. 4 illustrates a front view of the apparatus 100. As shown in FIG. 4, the ice shaper 110 may have a domed shape such that ice that has been conditioned by the ice conditioning blade 116 can be formed into a dome shape when a user or device causes the conditioned ice to build up within the ice shaper 110.

Figure 5:
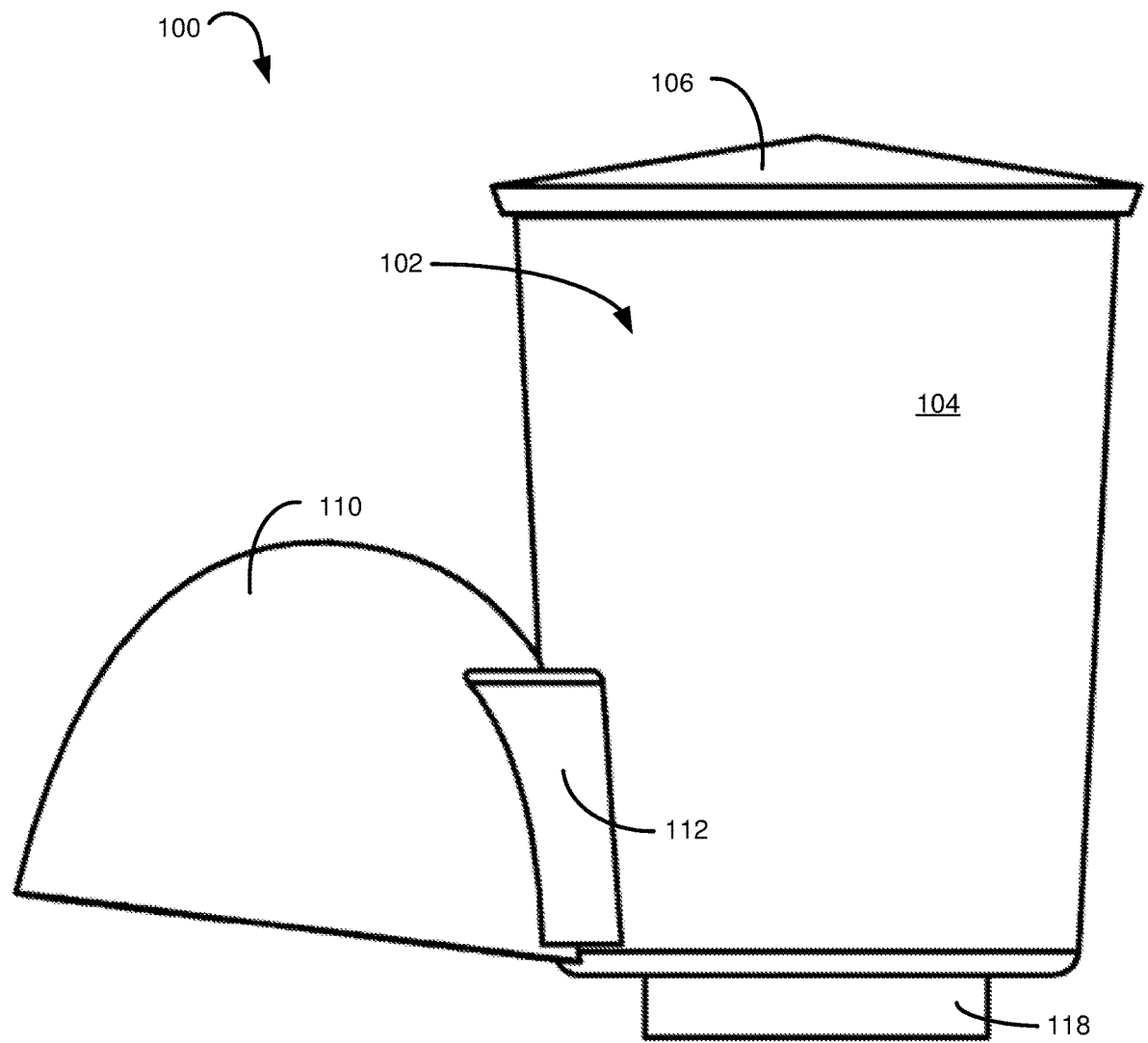
FIG. 5 illustrates a side view of an embodiment of a portable apparatus for producing a frozen confection with the motor of an independent device.

FIG. 5 illustrates a side view of the apparatus 100. As shown in FIG. 5, the spout 112 can extend off the housing 102 and connect the housing 102 to the ice shaper 110. The spout 112 provides a space for the conditioned ice to exit the apparatus 100 after passing through the ice conditioning blade 116. The spout 112 dispenses the conditioned ice after ice has been processed by moving through the ice conditioning blade 116. The spout 112 can be configured to deliver conditioned ice into the ice shaper 110 for providing a shaped top for the conditioned ice within a cup or container. In an embodiment, as illustrated in FIG. 5, an upper wall of the spout 112 may be larger than a lower wall of the spout 112. A wall may connect the upper wall to the lower wall of the spout 112 and may be arcuately or otherwise shaped. The ice shaper 110 may impart a shape to a final shaved ice product so that little or no additional shaping needs to be performed by a user after the conditioned ice has been collected. In an implementation, an additional flexible hand shaping flap may be included that provides more options for shaping during use without touching or coming into contact with the conditioned ice product. The flexible hand shaping flab can be attached below or near the spout 112.

As shown in FIG. 5, the lid 106 can be provided for covering the housing 102. The lid 102 can be hinged relative to the housing 102 so that the lid 106 rotates between opened and closed positions. For example, during use of the apparatus 100, the apparatus 100 may be secured to a blender or other device on a wood surface. A user may lift the lid 106 to expose the housing 102 and ice may then be introduced into the housing 102. The lid 106 may then be closed and held down by a latch, a user's hand, or by some other mechanism. A user may turn on the independent device, such as a blender or mixer, to cause the paddle 114 to spin within the housing 102. The paddle 114 drives ice into the ice conditioning blade 116. The ice is conditioned as it moves through the ice conditioning blade 116. The conditioned ice passes through the spout 112 and can be formed by the ice shaper 110 as the conditioned ice is collected in a cup or other receptacle.

Figure 6:
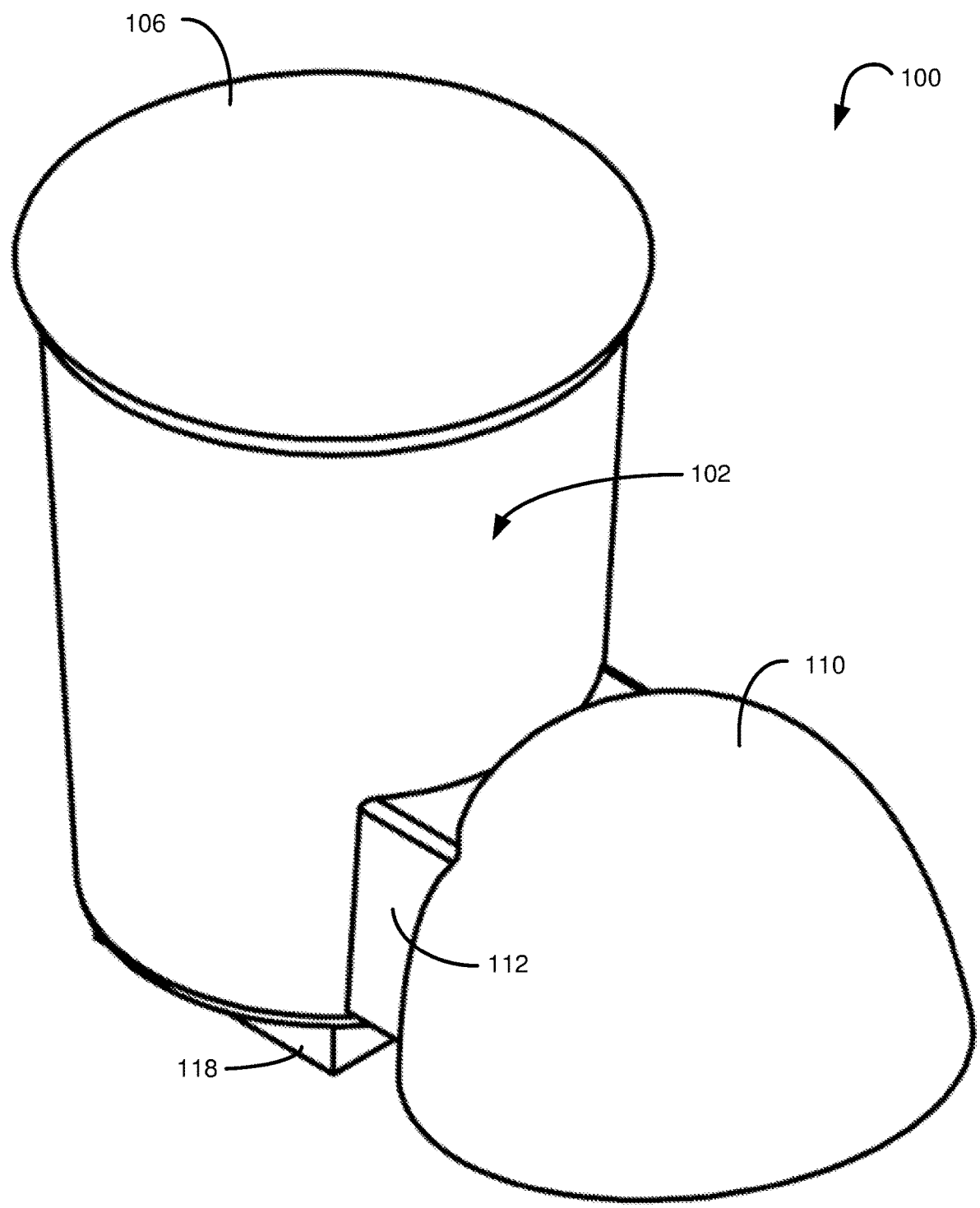
FIG. 6 illustrates an aerial perspective view of an embodiment of a portable apparatus for producing a frozen confection with the motor of an independent device.

FIG. 6 illustrates a perspective view of the apparatus 100. As shown, the motor attachment 118 may have a square or rectangular shape. In alternative embodiments, the motor attachment 118 may have any suitable shape for connecting with another device such as a blender or mixer. For example, the motor attachment 118 may be circular, oval, or otherwise without departing from the scope of the disclosure. In an embodiment, the motor attachment 118 is designed to connect with a corresponding blender, which may have a corresponding or matching square or rectangular or circular or oval shape, such that the motor attachment 118 slides onto and around the corresponding shape of the blender. In an embodiment, the motor attachment 118 is designed to connect with a blender having a matching round shape such that the motor attachment 118 slides on to and around the round shape of the blender. The motor attachment 118 provides stability and security such that the apparatus 100 can connect with a separate device and use the motor of the separate device. In an embodiment, the motor attachment 118 is a hollow space configured to receive a matching shape on a separate device such as a blender. In an embodiment, the motor attachment 118 includes ribbing, a clip, or some other locking mechanism to connect the apparatus 100 with the separate device.

Figure 7:
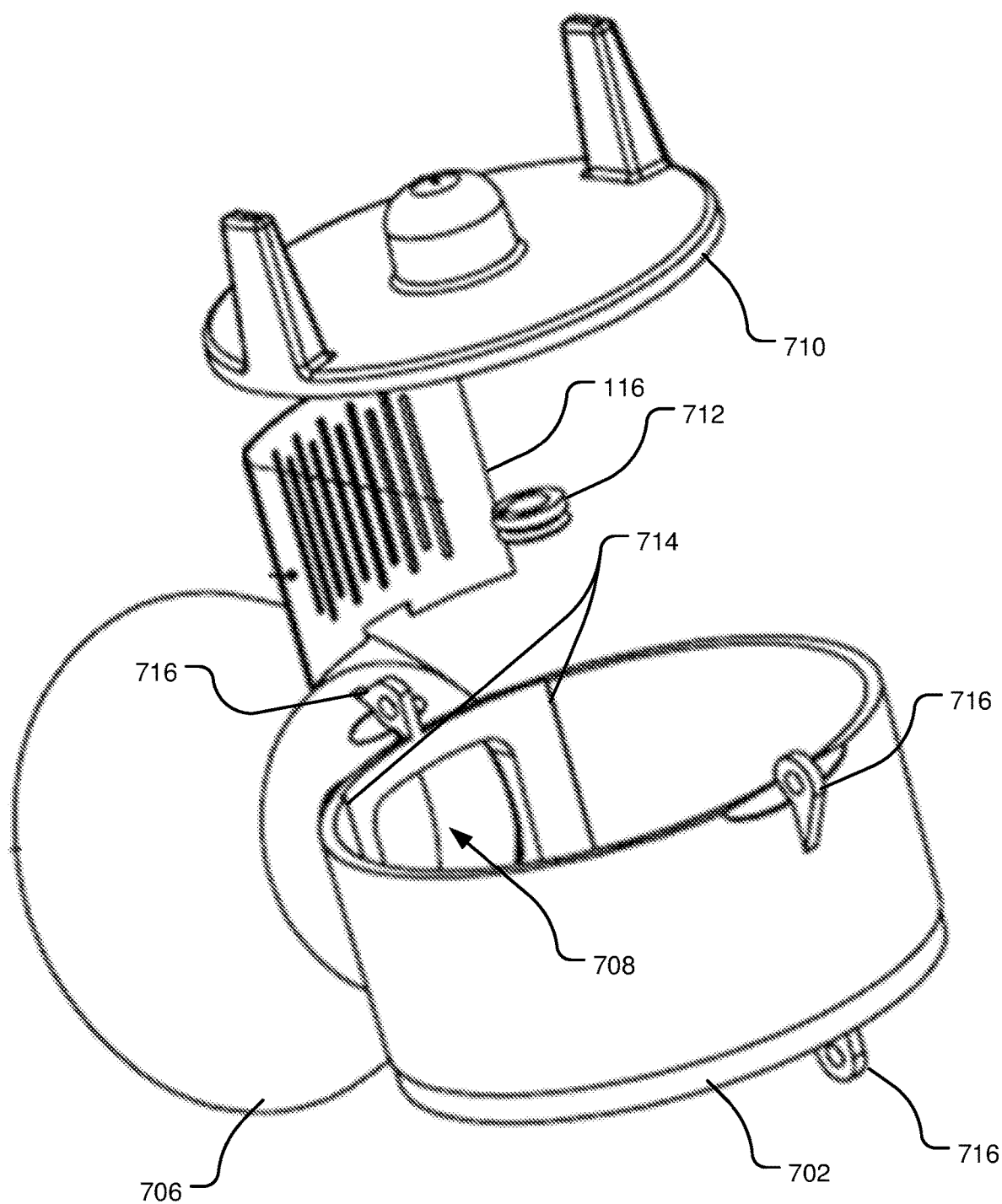
FIG. 7 illustrates an exploded view of an embodiment of a blade, lower wall of a housing, and a paddle wheel of a portable frozen confection apparatus.

FIG. 7 illustrates a close up expanded view of a lower wall 702 and blade 704 of an ice-conditioning apparatus. The lower wall 702 may be disposed within the housing 102 of the apparatus as a separate piece that may be removable for cleaning or inspecting. In an embodiment, the lower wall 702 constitutes a lower portion of the housing 102 that is contiguous with an upper portion of the housing 102. In an embodiment, the lower wall 702 further includes the motor attachment 118 portion of the apparatus 100 such that the lower wall 702 constitutes a lower portion of the housing 102 and further connects a paddle wheel 710 (in FIG. 7) or 122 (in FIG. 1) within the housing 102 to a drive shaft of a separate device such as a blender or mixer. In an embodiment, the lower wall 702 is a portion of the housing 102, and the combination of the housing 102 and the motor attachment 118 are a single piece of material such as metal or plastic. In an embodiment, the motor attachment 118 is a separate piece that attaches to the lower wall 702.

The blade 704 may include a blade similar to the ice conditioning blade 116 illustrated in FIGS. 1-3. The lower wall 702 may surround a lower portion of an interior of a housing. The lower wall 702 may include clear plastic so that a state of ice and/or the blade 704 within the housing can be seen. In one embodiment, the lower wall 702 is integrally formed with at least a portion of a spout 706 where conditioned ice may be dispensed. An opening 708 in the wall 702 is positioned at the spout 706. A paddle wheel 710 may be inserted and positioned at a bottom of or below the lower wall 702. The paddle wheel 710 may be secured to a drive axle or motor using a fastener 712. The lower wall 702 includes a recessed or an indented region bounded by grooves 714. The recessed or indented region may have a size matching the blade 704 so that the blade can be received into the recessed or indented region. Once positioned, an interior surface of the blade 704 (a surface that faces inward) may be further from an axis of the lower wall 702 than an interior surface of the lower wall 702 to limit ice from impacting an edge of the blade 704.

The blade 704 is positioned in-line with the lower wall 702 and may have a curvature matching the lower wall 702. When assembled, the blade 704 covers the opening 708 in the wall so that ice may only exit the housing or lower wall 702 through the blade 704. Thus, only conditioned ice may exit through the spout while remaining ice to-be-conditioned remains in the housing.

The lower wall 702 also includes attachment features 716 for securing the wall to or within a housing. In one embodiment, the blade 704 is replaceable. In one embodiment, one or more fasteners securing the attachment features 716 may be released to allow a housing or other portion of a machine to be pulled back and/or up to expose a top region of the blade. The blade 704 may then be slid upward for removal and a new blade may be slid downward into the recessed or indented portion. In one embodiment, once positioned, a lower portion of the blade 704 is positioned in a slot in a housing below the blade and an upper portion of the blade is positioned between the lower wall 702 or spout 706 on the outside and a portion of a housing on an upper side. Slits or slots in the blade 704 may remain exposed so that ice can come in contact with the blade 704 to condition the ice.

The spout 706 may be shaped to impart a desired dome or rounded top to a shaved ice product or snow cone. For example, the spout 706 includes a rounded spout with a substantially circular diameter that will form a top shape for conditioned ice as a cup or container is filled. The shape of the spout 706 may be configured to provide a desired shape and thus creating a shaved ice product may require little or no shaping after moving a container or cup away from the spout 706.

Figure 8:
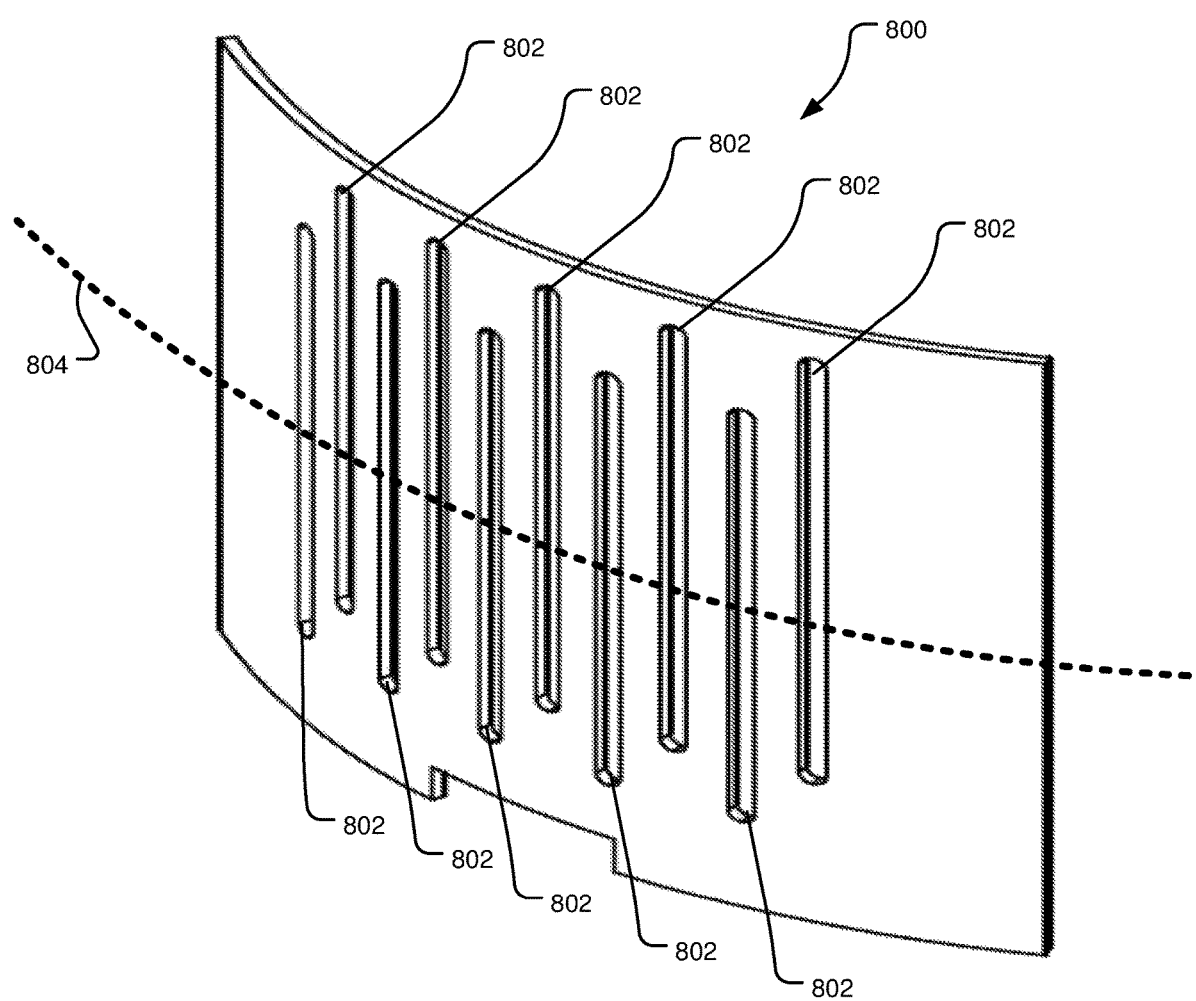
FIG. 8 illustrates an embodiment of a blade for a portable frozen confection apparatus.

FIG. 8 illustrates an embodiment of a blade 800 configured for conditioning ice as it is dispensed to a user. The blade 800 may be similar to the ice conditioning blade 116 shown in FIGS. 1-3 or the blade 704 shown in FIG. 7. Those in the art will know that when processing ice, ice buildup on equipment can be a problem. Illustrated in the figure is an embodiment of a blade 800 that resists ice buildup while providing conditioned ice suitable for confectionary use. As illustrated, a blade 800 may be an arched or arcuate planar sheet to match a curvature of a wall or housing and may comprise a plurality of teeth 802. In a particular embodiment, the blade 800 matches the curvature of a wall of the housing 102. The blade 800 includes one or more teeth 802 configured for conditioning the ice when the ice passes through the teeth 802. The ice may be pushed through the teeth by way of paddles 114 as shown herein.

The teeth 802 may be configured as slots or slits in the blade 800 that allow conditioned ice to form on a first side of the blade and pass through the blade 800 to a second side. In an embodiment, the teeth 802 may be uniform and placed regularly about the blade 800. In an embodiment, the teeth 802 are parallel as shown in the illustration of FIG. 8. In an embodiment, the teeth 802 include vertical, slanted and/or horizontal teeth. In an embodiment, all of the teeth 802 are parallel to one another. In an embodiment, two or more of the teeth 802, but not all of the teeth, are parallel to one another. In an embodiment, none of the teeth 802 are parallel. It will be appreciated that in an embodiment the blade 800 may comprise a plurality of offset teeth 802 relative to each other. For example, a tooth or slot may be vertically offset from a neighboring tooth or slot. The plurality of teeth 802 may be offset in an alternating pattern. Additionally, the teeth 802 may be situated on the blade in a pattern as is illustrated in FIG. 8.

As can be seen in FIG. 8, the teeth 802 alternate between an up position and down position relative to a center line 804, which is shown as a dashed line in the figure. The offset may reduce icing on the teeth 802 of the blade 800. It will be appreciated that any pattern may be employed, for example, three teeth in a row may be placed in a down position relative to the centerline 804, while next three teeth are placed in an up position relative to the centerline 804. The pattern may repeat as many times as desired. It will be appreciated that any number of teeth 802 may be placed in an up position and any number of teeth may be placed in a down position with respect to the centerline 804 without departing from the scope of the disclosure. Teeth 802 may also be formed with circular holes (similar to those of a cheese grater) or any other hole or slot shape. For example, the teeth 802 may include a square, rectangular, triangular, oblong circular, or other shaped hole. In one embodiment, the holes may have a bent or raised edge that protrudes at least slightly above a surface of the planar portion to present an edge for cutting or conditioning the ice. Although the blade 800 is shown having a curved planar shape, the blade 800 may be shaped or bent or flattened in other configurations. For example, the blade 800 may include a substantially flat planar shape with little or no curvature.

Figure 9:
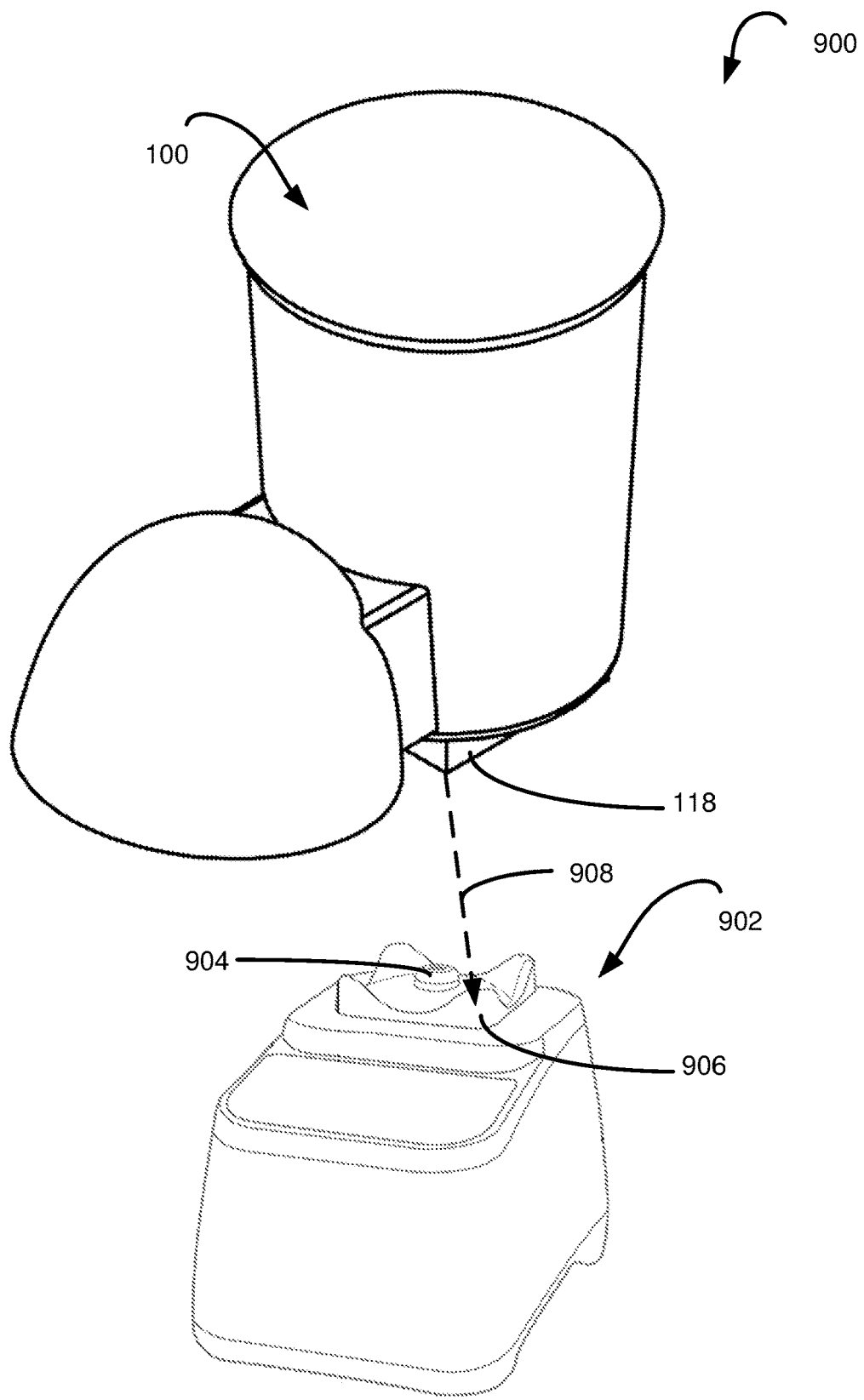
FIG. 9 illustrates a perspective view of a system for producing a frozen confection.

FIG. 9 illustrates a system 900 for connecting an apparatus 100 to a separate motorized device 902. The apparatus 100 is configured for conditioning ice into a frozen confection such as a snow coned or shaved ice dessert. The separate motorized device 902 may be any suitable device having a motor, such as a blender or mixer. The separate motorized device 902 includes a motor drive shaft 904 that may be received by a drive coupler 120 of the apparatus 100. The separate motorized device 902 includes an apparatus stabilizer 906 that may connect with the motor attachment 118 of the apparatus 100. As shown by the dotted line 908 in the FIG. 9, the motor attachment 118 of the apparatus 100 can be shaped to match the corresponding apparatus stabilizer 906 of the separate motorized device 902. In an embodiment as shown in FIG. 9, the apparatus 100 may receive the apparatus stabilizer 906 of the separate motorized device 902 such that the motor of the separate motorized device 902 is in communication with the paddles 114 of the apparatus 100.

Figure 10:
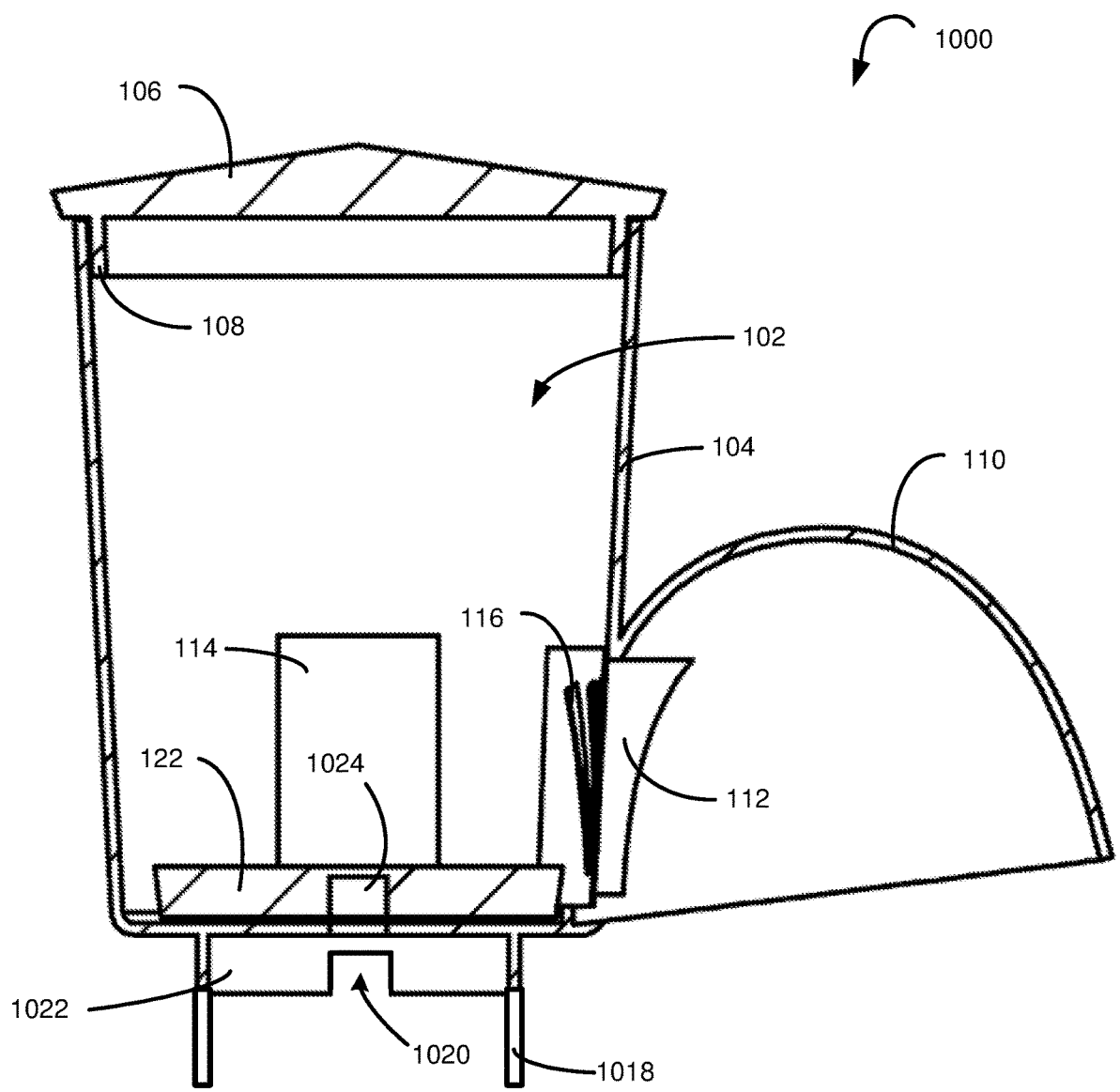
FIG. 10 illustrates a cross-sectional side view of an apparatus for producing a frozen confection with the motor of an independent device, wherein the apparatus further includes a downshifter.

FIG. 10 illustrates a cross-sectional side view of an embodiment of an apparatus 1000 for producing frozen confections. Similar to the apparatus 100 illustrated in FIG. 1, the apparatus 1000 is compatible with independent devices such as a blender or mixer, such that the apparatus 1000 can be operated by a motor of the independent device. In the embodiment illustrated in FIG. 10, the apparatus 1000 includes a drive coupler 1020 and a motor attachment 1018 that may be similar to those illustrated in FIG. 1. The apparatus 1000 additionally includes a gearbox 1022 and a drive shaft 1024. The gearbox 1022 is configured for receiving the power output from the motor (i.e. the motor of a blender, mixer, or other device) and reducing the power output that is then driven to the paddle wheel 122 by the drive shaft 1024.

In some implementations, the apparatus 1000 illustrated in FIG. 10 is useful when the power output of the motor is more than needed or desired for creating a frozen confection. For example, the motor may be too fast or produce too much torque, and this can cause the apparatus 1000 to obliterate the ice, eject ice too quickly from the apparatus 1000, or produce an undesirable frozen confection product. Further, it should be recognized that not all motorized devices, such as blenders, mixers, or other devices, will have the same power output. Some blenders may provide an optimum amount of power to the apparatus 1000 for creating a frozen confection while other blenders may provide too much power to the apparatus 1000 for creating a frozen confection. Further, in some implementations, the blender provides insufficient power to the apparatus 1000 for creating a frozen confection.

In an embodiment, the gearbox 1022 is configured to downshift the power output from the motor such that the power driven to the drive shaft 1024 is optimized for producing a frozen confection. The gearbox 1022 may additionally be configured to upshift the power output from the motor such that the power drive to the drive shaft 1024 is optimized for producing a frozen confection. The gearbox 1022 may configured to alter the speed and/or torque of the motor's driveshaft such that the driveshaft 1024 of the apparatus 1000 provides an optimum amount of power to the paddle wheel 122 for creating a frozen confection.

Figure 11:
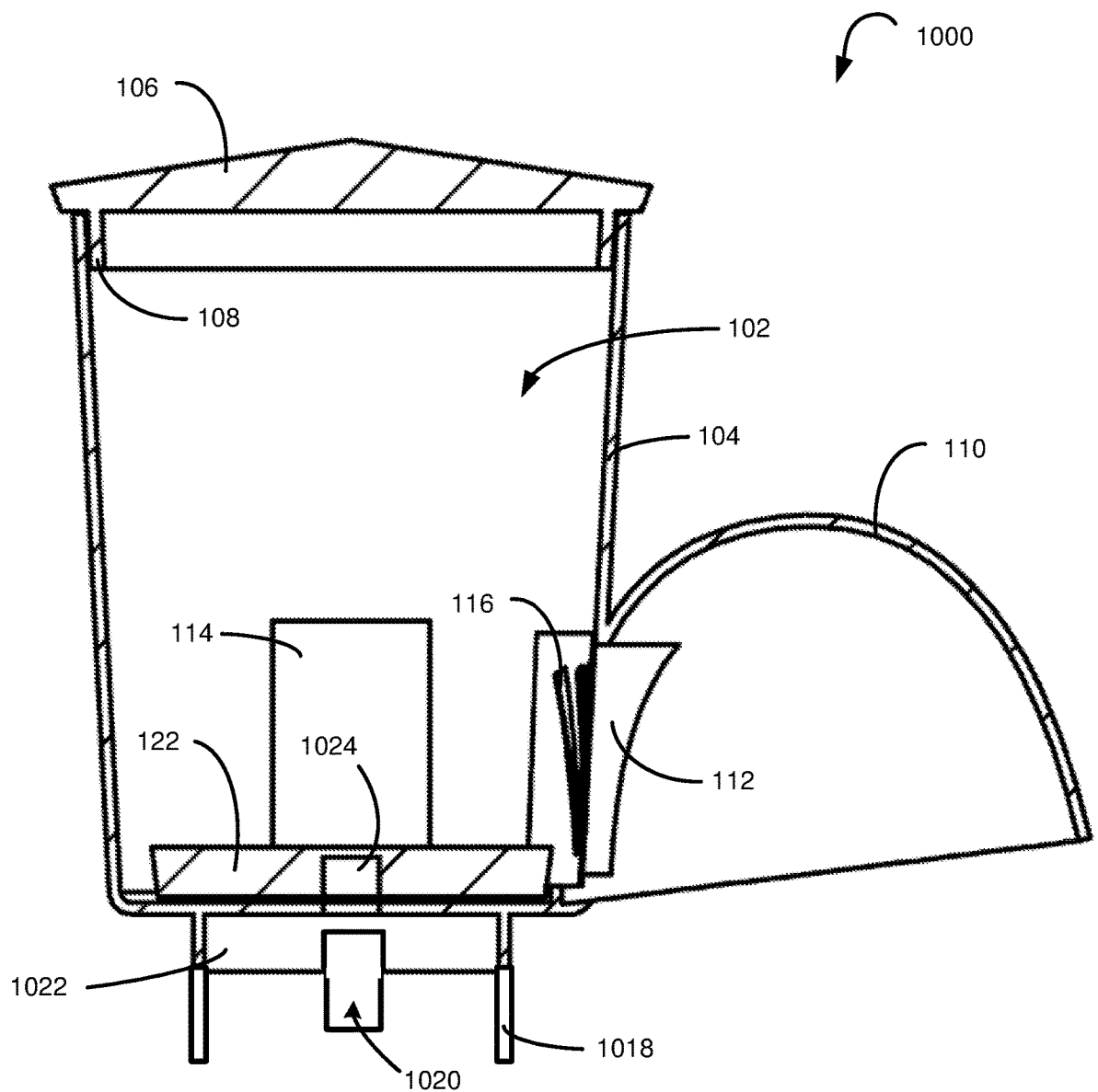
FIG. 11 illustrates a cross-sectional side view of an apparatus for producing a frozen confection with the motor of an independent device, wherein the apparatus further includes a downshifter.

FIG. 11 illustrates a cross-sectional side view of an embodiment of an apparatus 1000 for producing frozen confections. Similar to the apparatus 1000 illustrated in FIG. 10, the apparatus 1000 illustrated in FIG. 11 is compatible with independent devices and includes drive coupler 1020, gearbox 1022, and drive shaft 1024 for receiving power from the motor of an independent device and then downshifting that power. The gearbox 1022 and associated components for reducing the power received from an independent device before providing that power to the paddle wheel 122 may collectively be referred to herein as a "downshifter." The downshifter may be configured to reduce the torque and/or rotational speed received from the motor of the independent device before providing that power to the paddle wheel 122. In the embodiment illustrated in FIG. 11, the drive coupler 1020 is a male drive shaft configured for insertion into a corresponding female drive socket of an independent device. This is an alternative embodiment with respect to FIG. 10, wherein the drive coupler 1020 is a female drive socket configured for receiving a corresponding male drive shaft of an independent device.

EXAMPLES

The following examples pertain to further embodiments.

Example 1 is an apparatus for producing a frozen confection. The apparatus includes a housing comprising an inner cavity and one or more sidewalls. The inner cavity of the apparatus comprises a hopper configured for receiving ice therein. The apparatus includes a drive coupler configured for receiving a drive shaft of a separate device, wherein the drive shaft of the separate device is connected to a motor of the separate device. The apparatus includes a blade for conditioning the ice, wherein the blade is disposed within the hopper Example 2 is an apparatus as in Example 1, further including a spout for dispensing conditioned ice.

Example 3 is an apparatus as in any of Examples 1-2, wherein the spout is connected to the hopper.

Example 4 is an apparatus as in any of Examples 1-3, wherein the spout is removably attached to the hopper by way of a clip or other attachment mechanism.

Example 5 is an apparatus as in any of Examples 1-4, further including an ice shaper for shaping the conditioned ice.

Example 6 is an apparatus as in any of Examples 1-5, further including a lid for covering the hopper.

Example 7 is an apparatus as in any of Examples 1-6, wherein the hopper is a receptable configured for use with the separate device.

Example 8 is an apparatus as in any of Examples 1-7, wherein the separate device is a blender.

Example 9 is an apparatus as in any of Examples 1-8, wherein the hopper is a jar configured to be used with the blender.

Example 10 is an apparatus as in any of Examples 1-9, wherein the separate device is a mixer.

Example 11 is an apparatus as in any of Examples 1-10, wherein the hopper is a bowl configured to be used with the mixer.

Example 12 is an apparatus as in any of Examples 1-11, further including a paddle connected to the drive coupler.

Example 13 is an apparatus as in any of Examples 1-12, wherein the paddle is connected to the drive coupler by way of a paddle wheel.

Example 14 is an apparatus as in any of Examples 1-13, wherein the drive coupler is disposed within the paddle wheel, and wherein the paddle, the paddle wheel, and the drive coupler are constructed of a single piece of material.

Example 15 is an apparatus as in any of Examples 1-14, wherein the paddle wheel is removably connected to the hopper.

Example 16 is an apparatus as in any of Examples 1-15, wherein the paddle wheel is connected to the drive coupler such that the motor of the separate device can cause the paddle wheel to spin when the drive shaft of the separate device is received by the drive coupler.

Example 17 is an apparatus as in any of Examples 1-16, wherein the blade includes one or more teeth for conditioning ice, wherein the one or more teeth are configured for shaving the ice into granules or flakes when the ice passes through the one or more teeth.

Example 18 is an apparatus as in any of Examples 1-17, wherein the one or more teeth are parallel.

Example 19 is an apparatus as in any of Examples 1-18, wherein the blade includes a plurality of teeth, and wherein two or more, but not all, of the plurality of teeth are parallel.

Example 20 is an apparatus as in any of Examples 1-19, wherein the one or more teeth are vertical with respect to a body of the hopper.

Example 21 is an apparatus as in any of Examples 1-20, wherein the one or more teeth are horizontal with respect to the body of the hopper.

Example 22 is an apparatus as in any of Examples 1-21, wherein the one or more teeth are slanted with respect to the body of the hopper.

Example 23 is an apparatus as in any of Examples 1-22, wherein the paddle wheel includes at least two paddles, and wherein the paddle wheels spins within an interior space of the hopper.

Example 24 is an apparatus as in any of Examples 1-23, wherein the at least two paddles attached to the paddle wheel cause ice to be pushed through the blade when the paddle wheel spins within the interior space of the hopper.

Example 25 is an apparatus as in any of Examples 1-24, wherein the hopper is constructed of a transparent material such that ice within the hopper can be seen.

Example 26 is an apparatus as in any of Examples 1-25, wherein the conditioned ice is cut or shaved into granules or flakes suitable for use as a snow cone or shaved ice confection.

Example 27 is an apparatus as in any of Examples 1-26, further including a motor attachment configured for receiving a corresponding attachment structure on the separate device.

Example 28 is an apparatus as in any of Examples 1-27, wherein the paddle wheel is removably attached to the hopper.

Example 29 is an apparatus as in any of Examples 1-28, wherein the two or more paddles and the paddle wheel are constructed of a single piece of material.

Example 30 is an apparatus as in any of Examples 1-29, wherein the hopper, the ice shaper, and the motor receiver are constructed of a single piece of material.

Example 31 is an apparatus as in any of Examples 1-30, wherein the ice shaper is removably attached to wall of the hopper.

Example 32 is an apparatus as in any of Examples 1-31, wherein the hopper has a columnar shape.

Example 33 is an apparatus as in any of Examples 1-32, wherein the hopper has a rectangular prism shape.

Example 34 is an apparatus as in any of Examples 1-33, wherein the hopper has interior walls having a smooth surface texture.

Example 35 is an apparatus as in any of Examples 1-34, wherein the blade is stationary and disposed within a wall of the hopper.

Example 36 is an apparatus as in any of Examples 1-35, wherein the hopper has a round curvature and wherein the blade has a round curvature matching the round curvature of the hopper.

Example 37 is an apparatus as in any of Examples 1-36, wherein the plurality of teeth of the blade are offset in an alternating pattern.

Example 38 is an apparatus as in any of Examples 1-37, wherein the lid includes a transparent portion for monitoring ice in the hopper.

Example 39 is an apparatus as in any of Examples 1-38, further including a flexible shaping flap attached near the spout, wherein the flexible shaping flap is configured for shaping the conditioned ice by hand without touching the conditioned ice.

Example 40 is an apparatus as in any of Examples 1-39, further including a lid latching mechanism for holding the lid in a closed position closing a top of the hopper.

Example 41 is an apparatus as in any of Examples 1-40, wherein the hopper has an open top space and wherein the lid is a separate piece with respect to the hopper.

Example 42 is an apparatus as in any of Examples 1-41, wherein the paddle wheel is directly connected to the drive coupler.

Example 43 is an apparatus as in any of Examples 1-42, wherein the drive coupler includes one or more ribs for communicating with corresponding ribs of the drive shaft of the separate device.

Example 44 is an apparatus as in any of Examples 1-43, wherein the drive coupler is configured to spin by way of the drive shaft of the separate device, wherein the drive shaft of the separate device is directly connected to the motor of the separate device.

Example 45 is an apparatus as in any of Examples 1-44, wherein the paddle wheel and the hopper are constructed of a single piece of a material.

Example 46 is an apparatus as in any of Examples 1-45, wherein the paddle wheel and the hopper are separate pieces.

Example 47 is a system. The system includes a blender base and an apparatus for producing a frozen confection. The blender base includes a motor connected to a drive shaft. The apparatus includes a hopper configured for receiving ice therein. The apparatus includes a drive coupler configured for receiving the drive shaft of the blender base. The drive coupler is configured for connecting to the drive shaft of the blender base such that the motor of the blender base causes a paddle wheel to spin within the hopper. The apparatus includes a blade for conditioning ice, wherein the blade is disposed within the hopper.

Example 48 is a system as in Example 47, wherein the apparatus further includes a spout for dispensing conditioned ice, wherein the spout is connected to the hopper.

Example 49 is a system as in any of Examples 47-48, wherein the apparatus further includes a paddle attached to the paddle wheel, wherein the paddle is configured to move ice within the hopper and push the ice within the hopper through the blade.

Example 50 is a system as in any of Examples 47-49, wherein the blade includes one or more teeth for conditioning ice, wherein the one or more teeth are configured for shaving the ice into granules or flakes when the ice passes through the one or more teeth.

Example 51 is an apparatus. The apparatus includes a housing comprising a sidewall and an inner cavity. The apparatus includes an ice conditioning blade disposed within the sidewall of the housing. The apparatus includes a paddle wheel disposed within the inner cavity of the housing. The apparatus includes a drive coupler for communicating with a motor, wherein the drive coupler communicates power from the motor to the paddle wheel.

Example 52 is an apparatus as in Example 51, further comprising a motor attachment connected to the housing, wherein the motor attachment is configured for connecting the apparatus to an independent device comprising the motor such that the drive coupler can receive power from the motor of the independent device.

Example 53 is an apparatus as in any of Examples 51-52, wherein the drive coupler comprises a drive shaft for insertion into a drive socket of an independent device, wherein the independent device comprises the motor.

Example 54 is an apparatus as in any of Examples 51-53, wherein the drive coupler comprises a drive socket for receiving a drive shaft of an independent device, wherein the independent device comprises the motor.

Example 55 is an apparatus as in any of Examples 51-54, wherein the motor is a component of an independent device, and wherein the drive coupler communicates power from the motor of the independent device to the paddle wheel of the apparatus.

Example 56 is an apparatus as in any of Examples 51-55, wherein the motor is a component of an independent device, and wherein the drive coupler communicates torque and rotation from the motor of the independent device to the paddle wheel of the apparatus.

Example 57 is an apparatus as in any of Examples 51-56, wherein the paddle wheel comprises an axis of rotation, and wherein the axis of rotation of the paddle wheel is aligned with a center axis of the housing.

Example 58 is an apparatus as in any of Examples 51-57, wherein each of the paddle wheel and the drive coupler comprises an axis of rotation, and wherein the axis of rotation of the paddle wheel is aligned with the axis of rotation of the drive coupler.

Example 59 is an apparatus as in any of Examples 51-58, wherein the apparatus is configured to communicate with an independent device comprising the motor, wherein the independent device is a blender or a mixer.

Example 60 is an apparatus as in any of Examples 51-59, wherein: the motor is a component of a blender base, and the blender base is independent of the apparatus; the blender base comprises a drive socket for receiving the drive coupler; and the drive coupler comprises a drive shaft for insertion into the drive socket of the blender base.

Example 61 is an apparatus as in any of Examples 51-60, wherein: the motor is a component of a blender base, and the blender base is independent of the apparatus; the blender base comprises a drive shaft for insertion into the drive coupler; and the drive coupler comprises a drive socket for receiving the drive shaft of the blender base.

Example 62 is an apparatus as in any of Examples 51-61, wherein the apparatus is configured to communicate with an independent device comprising the motor and the drive shaft, and wherein the drive shaft of the independent device rotates about an axis of rotation that is aligned with a center axis of the housing.

Example 63 is an apparatus as in any of Examples 51-62, further comprising a spout for dispensing conditioned ice after being conditioned by the ice conditioning blade, wherein the spout comprises a domed shape for shaping the conditioned ice.

Example 64 is an apparatus as in any of Examples 51-63, further comprising one or more paddles attached to the paddle wheel for feeding ice into the ice conditioning blade, wherein the one or more paddles are configured to revolve about a center axis of the housing.

Example 65 is an apparatus as in any of Examples 51-64, further comprising a paddle attached to the paddle wheel for feeding ice into the ice conditioning blade, wherein the paddle is configured to rotate about a center axis of the housing.

Example 66 is an apparatus as in any of Examples 51-65, wherein the ice conditioning blade is stationary during operation such that the paddle wheel feeds ice into the ice conditioning blade.

Example 67 is an apparatus as in any of Examples 51-66, wherein the ice conditioning blade comprises an arched shape and further comprises a plurality of teeth, wherein the plurality of teeth are offset relative to one another in an alternating pattern.

Example 68 is an apparatus as in any of Examples 51-67, further comprising a lid for covering the inner cavity of the housing.

Example 69 is an apparatus as in any of Examples 51-68, further comprising a downshifter for reducing power output received from the motor, wherein the motor is a component of an independent device.

Example 70 is an apparatus as in any of Examples 51-69, wherein the downshifter is configured to one or more of: reduce torque received from the motor; or reduce speed of rotation received from the motor.

Example 71 is an apparatus as in any of Examples 51-70, wherein the downshifter is configured to optimize power input to the paddle wheel for conditioning ice with the ice conditioning blade, wherein optimizing the power input to the paddle wheel comprises reducing power received from the motor.

Example 72 is an apparatus as in any of Examples 51-71, wherein the ice conditioning blade comprises a plurality of teeth, and wherein the ice conditioning blade is attached to the sidewall of the housing at an angle relative to the sidewall of the housing.

Example 73 is an apparatus as in any of Examples 51-72, wherein the angle of the ice conditioning blade relative to the sidewall of the housing is from about 10 degrees to about 50 degrees.

Example 74 is an apparatus as in any of Examples 51-73, further comprising a seal disposed around the drive coupler for preventing fluid leaks from housing.

Example 75 is an apparatus as in any of Examples 51-74, wherein the housing is a jar for use in connection with a blender base, wherein the blender base comprises the motor, and wherein the apparatus is independent of the blender base.

Example 76 is a system. The system includes a housing comprising a sidewall and an inner cavity for receiving ice. The system includes an ice conditioning blade disposed within the sidewall of the housing. The system includes a paddle wheel disposed within the inner cavity of the housing. The system includes a motor for providing torque and rotation. The system includes a drive coupler attached to the housing for communicating with the motor, wherein the drive coupler communicates power from the motor to the paddle wheel.

Example 77 is a system as in Example 76, further comprising a motor attachment connected to the housing, wherein the motor attachment is configured for connecting the apparatus to a base comprising the motor such that the drive coupler can receive power from the motor.

Example 78 is a system as in any of Examples 76-77, wherein the drive coupler comprises a drive shaft for insertion into a drive socket of a base that is independent of the housing, and wherein the motor is disposed within the base.

Example 79 is a system as in any of Examples 76-78, wherein the drive coupler comprises a drive socket for receiving a drive shaft of a base that is independent of the housing, wherein the motor is disposed within the base.

Example 80 is a system as in any of Examples 76-79, wherein the motor is a component of a base that is independent of the housing.

Example 81 is a system as in any of Examples 76-80, wherein the paddle wheel comprises an axis of rotation, and wherein the axis of rotation of the paddle wheel is aligned with a center axis of the housing.

Example 82 is a system as in any of Examples 76-81, wherein each of the paddle wheel and the drive coupler comprises an axis of rotation, and wherein the axis of rotation of the paddle wheel is aligned with the axis of rotation of the drive coupler.

Example 83 is a system as in any of Examples 76-82, wherein: the motor is a component of a blender base, and the blender base is independent of the housing; the blender base comprises a drive socket for receiving the drive coupler; and the drive coupler comprises a drive shaft for insertion into the drive socket of the blender base.

Example 84 is a system as in any of Examples 76-83, wherein: the motor is a component of a blender base, and the blender base is independent of the housing; the blender base comprises a drive shaft for insertion into the drive coupler; and the drive coupler comprises a drive socket for receiving the drive shaft of the blender base.

Example 85 is a system as in any of Examples 76-84, wherein the drive coupler is configured to communicate with a base comprising the motor and a drive shaft, wherein the base is independent of the housing, and wherein the drive shaft of the base rotates about an axis of rotation that is aligned with a center axis of the housing.

Example 86 is a system as in any of Examples 76-85, further comprising a spout for dispensing conditioned ice after being conditioned by the ice conditioning blade, wherein the spout comprises a domed shape for shaping the conditioned ice.

Example 87 is a system as in any of Examples 76-86, further comprising one or more paddles attached to the paddle wheel for feeding ice into the ice conditioning blade, wherein the one or more paddles are configured to revolve about a center axis of the housing.

Example 88 is a system as in any of Examples 76-87, further comprising a paddle attached to the paddle wheel for feeding ice into the ice conditioning blade, wherein the paddle is configured to rotate about a center axis of the housing.

Example 89 is a system as in any of Examples 76-88, wherein the ice conditioning blade is stationary during operation such that the paddle wheel feeds ice into the ice conditioning blade.

Example 90 is a system as in any of Examples 76-89, wherein the ice conditioning blade comprises an arched shape and further comprises a plurality of teeth, wherein the plurality of teeth are offset relative to one another in an alternating pattern.

Example 91 is a system as in any of Examples 76-90, further comprising a lid for covering the inner cavity of the housing.

Example 92 is a system as in any of Examples 76-91, further comprising a downshifter for reducing power output received from the motor, wherein the motor is a component of an independent device.

Example 93 is a system as in any of Examples 76-92, wherein the downshifter is configured to one or more of: reduce torque received from the motor; or reduce speed of rotation received from the motor.

Example 94 is a system as in any of Examples 76-93, wherein the downshifter is configured to optimize power input to the paddle wheel for conditioning ice with the ice conditioning blade, wherein optimizing the power input to the paddle wheel comprises reducing power received from the motor.

Example 95 is a system as in any of Examples 76-94, wherein the ice conditioning blade comprises a plurality of teeth, and wherein the ice conditioning blade is attached to the sidewall of the housing at an angle relative to the sidewall of the housing.

Example 96 is a system as in any of Examples 76-95, wherein the angle of the ice conditioning blade relative to the sidewall of the housing is from about 10 degrees to about 50 degrees.

Example 97 is a system as in any of Examples 76-96, further comprising a seal disposed around the drive coupler for preventing fluid leaks from housing.

Example 98 is a system as in any of Examples 76-97, wherein the housing is a jar for use in connection with a blender base, wherein the blender base comprises the motor, and wherein the apparatus is independent of the blender base.

It will be appreciated that the foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

It should be noted that embodiments shown in the figures and described herein are intended to be exemplary and that any variations in the size and the relative proportions of the individual components fall within the scope of this disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. An apparatus comprising:
    a housing comprising an inner cavity defined by a sidewall;
    an ice conditioning blade disposed within the sidewall of the housing;
    a paddle wheel disposed within the inner cavity of the housing; and
    a drive coupler for communicating with a motor, wherein the drive coupler comprises a drive socket;
    wherein the drive coupler is partially disposed in the housing; and
    wherein the drive coupler communicates power from the motor to the paddle wheel.

2. The apparatus of claim 1, further comprising a motor attachment connected to the housing, wherein the motor attachment is configured for connecting the apparatus to an independent device comprising the motor.

3. The apparatus of claim 1, wherein the drive coupler is configured for receiving a drive shaft of an independent device, wherein the independent device comprises the motor.

4. The apparatus of claim 1, wherein the motor is a component of an independent device, and wherein the drive coupler communicates power from the motor of the independent device to the paddle wheel of the apparatus.

5. The apparatus of claim 1, wherein the motor is a component of an independent device, and wherein the drive coupler communicates torque and rotation from the motor of the independent device to the paddle wheel of the apparatus.

6. The apparatus of claim 1, wherein the paddle wheel comprises an axis of rotation, and wherein the axis of rotation of the paddle wheel is aligned with a center axis of the housing.

7. The apparatus of claim 1, wherein each of the paddle wheel and the drive coupler comprises an axis of rotation, and wherein the axis of rotation of the paddle wheel is aligned with the axis of rotation of the drive coupler.

8. The apparatus of claim 1, wherein the apparatus is configured to communicate with an independent device comprising the motor, wherein the independent device is a blender or a mixer.

9. The apparatus of claim 1, wherein:
the motor is a component of a blender base, and the blender base is independent of the apparatus;
the blender base comprises a drive shaft for insertion into the drive coupler; and
the drive coupler is configured to receive the drive shaft of the blender base.

10. The apparatus of claim 1, wherein the apparatus is configured to communicate with an independent device comprising the motor and a drive shaft, and wherein the drive shaft of the independent device rotates about an axis of rotation that is aligned with a center axis of the housing.

11. The apparatus of claim 1, further comprising a spout for dispensing conditioned ice after being conditioned by the ice conditioning blade, wherein the spout comprises a domed shape for shaping the conditioned ice.

12. The apparatus of claim 1, further comprising one or more paddles attached to the paddle wheel for feeding ice into the ice conditioning blade, wherein the one or more paddles are configured to revolve about a center axis of the housing.

13. The apparatus of claim 1, further comprising a paddle attached to the paddle wheel for feeding ice into the ice conditioning blade, wherein the paddle is configured to rotate about a center axis of the housing.

14. The apparatus of claim 1, wherein the ice conditioning blade is configured to be stationary during operation such that the paddle wheel feeds ice into the ice conditioning blade.

15. The apparatus of claim 1, wherein the ice conditioning blade comprises an arched shape and further comprises a plurality of teeth, wherein the plurality of teeth are offset relative to one another in an alternating pattern.

16. The apparatus of claim 1, further comprising a lid for covering the inner cavity of the housing.

17. The apparatus of claim 1, further comprising a downshifter for reducing power output received from the motor, wherein the motor is a component of an independent device.

18. The apparatus of claim 17, wherein the downshifter is configured to one or more of:
reduce torque received from the motor; or
reduce speed of rotation received from the motor.

19. The apparatus of claim 17, wherein the downshifter is configured to optimize power input to the paddle wheel for conditioning ice with the ice conditioning blade, wherein optimizing the power input to the paddle wheel comprises reducing power received from the motor.

20. The apparatus of claim 1, wherein the ice conditioning blade comprises a plurality of teeth, and wherein the ice conditioning blade is attached to the sidewall of the housing at an angle relative to the sidewall of the housing.

21. The apparatus of claim 1, wherein the ice conditioning blade is disposed at an angle from about 10 degrees to about 50 degrees relative to the sidewall of the housing.

22. The apparatus of claim 1, further comprising a seal disposed around the drive coupler for preventing fluid leaks from housing.

23. The apparatus of claim 1, wherein the housing is a jar for use in connection with a blender base, wherein the blender base comprises the motor, and wherein the apparatus is independent of the blender base.

24. The apparatus of claim 1, wherein the drive coupler is partially disposed within a bottom wall of the housing.

25. An apparatus comprising:
a housing comprising an inner cavity defined by a sidewall;
an ice conditioning blade disposed within the sidewall of the housing;
a paddle wheel disposed within the inner cavity of the housing; and
a drive coupler for communicating with a motor, wherein the drive coupler comprises a drive shaft;
wherein the drive coupler is partially disposed in the bottommost wall of the housing and partially protrudes from the housing for communicating with the motor; and
wherein the drive coupler communicates power from the motor to the paddle wheel.

26. The apparatus of claim 25, wherein the drive coupler is configured for insertion into a drive socket of an independent device, wherein the independent device comprises the motor.

27. The apparatus of claim 25, wherein:
the motor is a component of a blender base, and the blender base is independent of the apparatus;
the blender base comprises a drive socket for receiving the drive coupler; and
the drive coupler is configured for insertion into the drive socket of the blender base.

28. The apparatus of claim 25, wherein the drive coupler is partially disposed in a bottom wall of the housing.

29. An apparatus comprising:
a housing comprising an inner cavity defined by a sidewall;
an ice conditioning blade disposed within the sidewall of the housing;
a paddle wheel disposed within the inner cavity of the housing;
a drive coupler for communicating with a motor, wherein the drive coupler communicates power from the motor to the paddle wheel;
wherein the drive coupler is partially disposed in the bottommost wall of the housing and partially protrudes from the housing for communicating with the motor; and
a downshifter for reducing power output received from a motor, wherein the motor is a component of an independent device.

30. The apparatus of claim 29, wherein the downshifter is configured to one or more of:
reduce torque received from the motor, wherein the motor is a component of an independent device; or
reduce speed of rotation received from the motor, wherein the motor is a component of an independent device.

31. The apparatus of claim 29, wherein the downshifter is configured to optimize power input to the paddle wheel for conditioning ice with the ice conditioning blade, wherein optimizing the power input to the paddle wheel comprises reducing power received from the motor.

32. The apparatus of claim 29, wherein the drive coupler is partially disposed in a bottom wall of the housing.

* * * * *